(12) United States Patent
Huang

(10) Patent No.: US 9,058,255 B2
(45) Date of Patent: Jun. 16, 2015

(54) SOLID STATE DRIVE AND METHOD FOR CONSTRUCTING LOGICAL-TO-PHYSICAL TABLE THEREOF

(75) Inventor: Chih-Wei Huang, Hsinchu (TW)

(73) Assignee: LITE-ON TECHNOLOGY CORPORATION, Taipei (TW)

(*) Notice: Subject to any disclaimer, the term of this patent is extended or adjusted under 35 U.S.C. 154(b) by 497 days.

(21) Appl. No.: 13/446,129

(22) Filed: Apr. 13, 2012

(65) Prior Publication Data
US 2013/0124782 A1    May 16, 2013

(30) Foreign Application Priority Data
Nov. 11, 2011   (CN) .......................... 2011 1 0357598

(51) Int. Cl.
*G06F 12/00*   (2006.01)
*G06F 12/02*   (2006.01)
*G06F 12/10*   (2006.01)

(52) U.S. Cl.
CPC ............ *G06F 12/0246* (2013.01); *G06F 12/10* (2013.01); *G06F 2212/7202* (2013.01)

(58) Field of Classification Search
CPC ............................. G06F 12/0246; G06F 12/10
See application file for complete search history.

(56) References Cited

U.S. PATENT DOCUMENTS

| | | | | |
|---|---|---|---|---|
| 6,038,639 | A * | 3/2000 | O'Brien et al. | 711/114 |
| 2007/0005928 | A1 * | 1/2007 | Trika et al. | 711/202 |
| 2007/0168698 | A1 * | 7/2007 | Coulson et al. | 714/5 |
| 2008/0177936 | A1 * | 7/2008 | Lasser et al. | 711/103 |
| 2009/0276586 | A1 * | 11/2009 | Royer et al. | 711/154 |

* cited by examiner

*Primary Examiner* — Aracelis Ruiz
(74) *Attorney, Agent, or Firm* — WPAT, PC; Justin King

(57) ABSTRACT

A solid state drive and a method for constructing a logical-to-physical table of the solid state drive are provided. Once the solid state drive is powered on again, the logical-to-physical table and the bitmap table are directly read from the flash memory. Then, the blocks whose history numbers are higher than the reference history number are searched from the flash memory. According to the history numbers in an ascending order, the physical-to-logical data in the blocks are sequentially reconstructed into the logical-to-physical table and the bitmap table of the mapping unit. Consequently, the logical-to-physical table and the bitmap table can be quickly reconstructed.

9 Claims, 8 Drawing Sheets

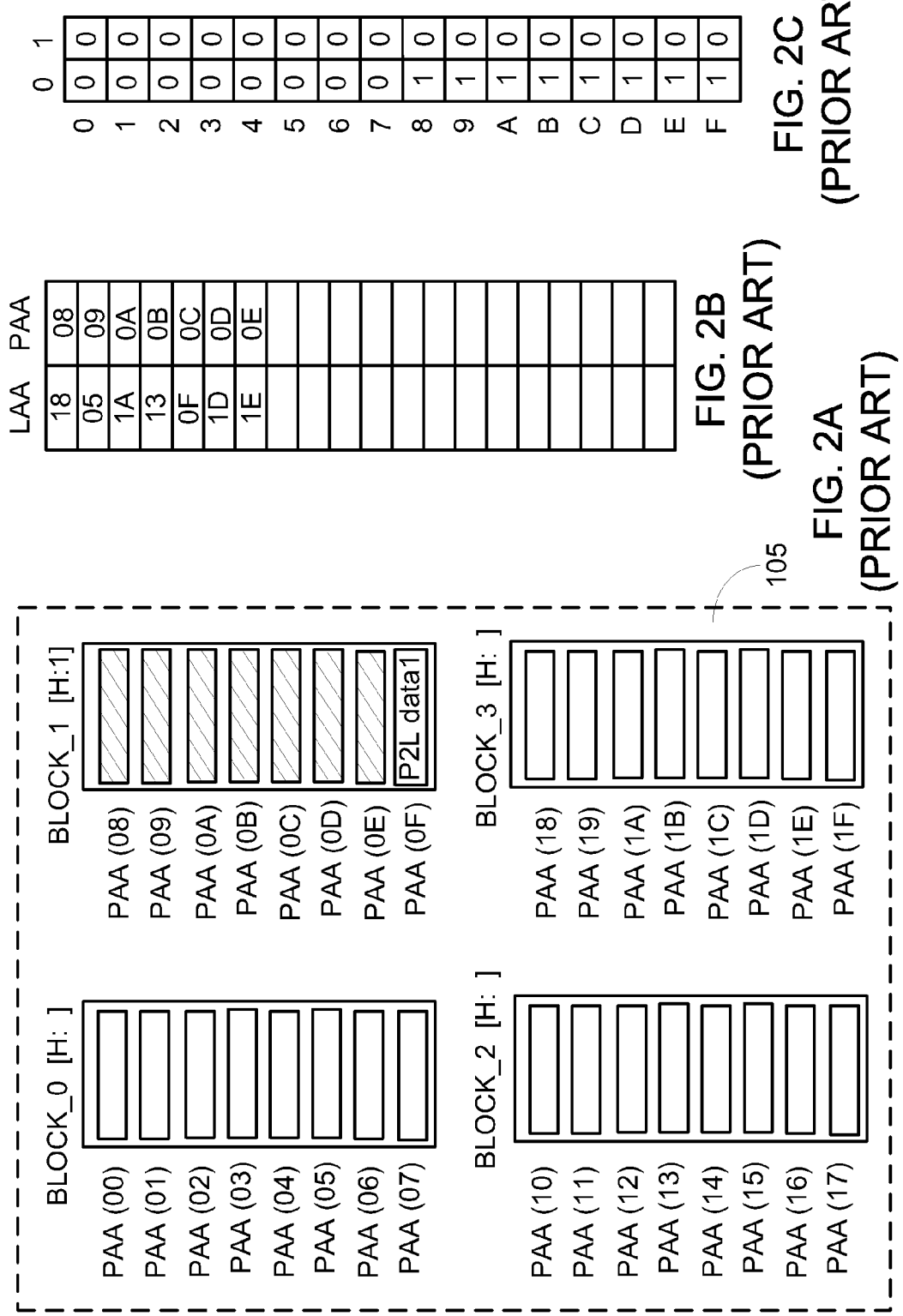

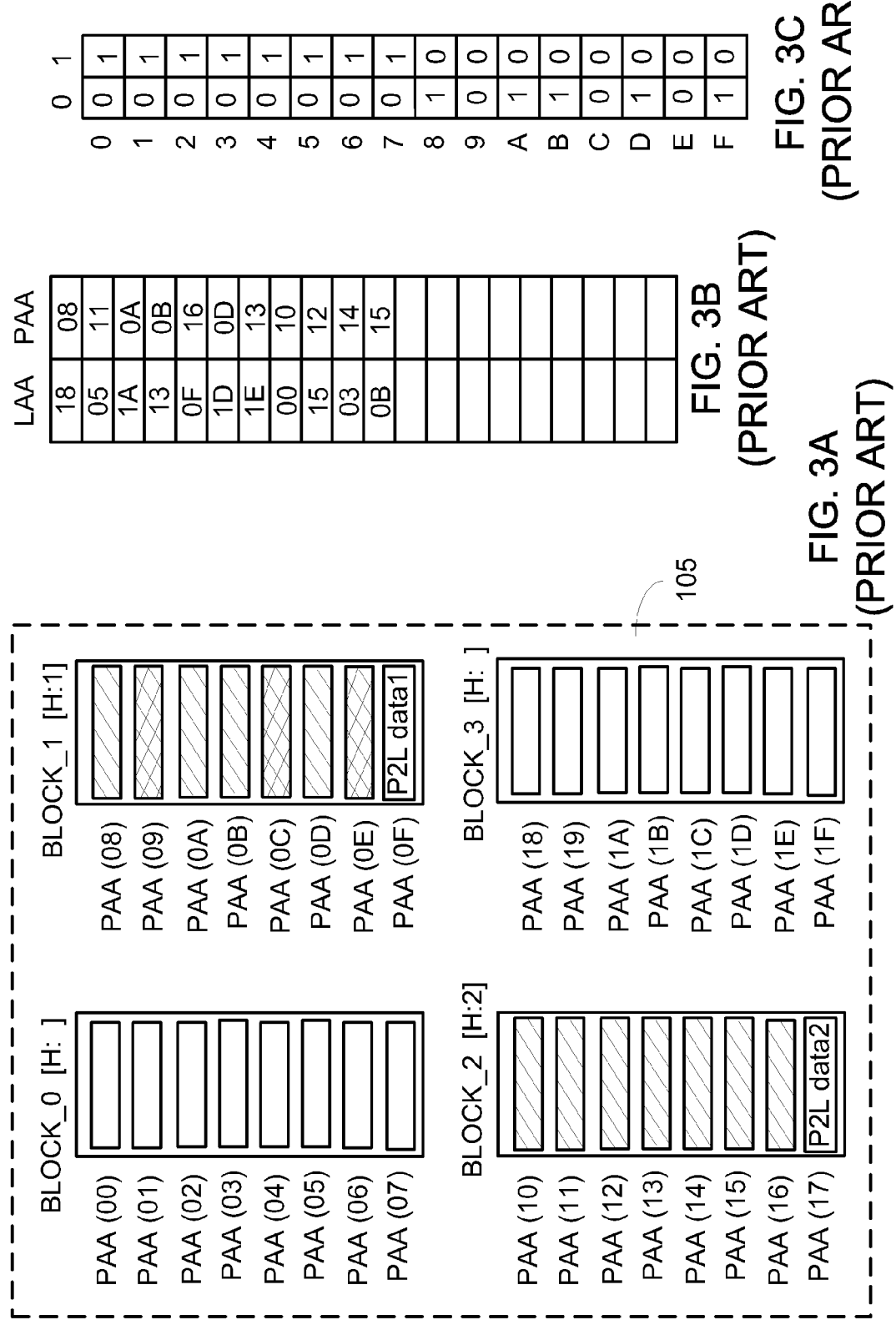

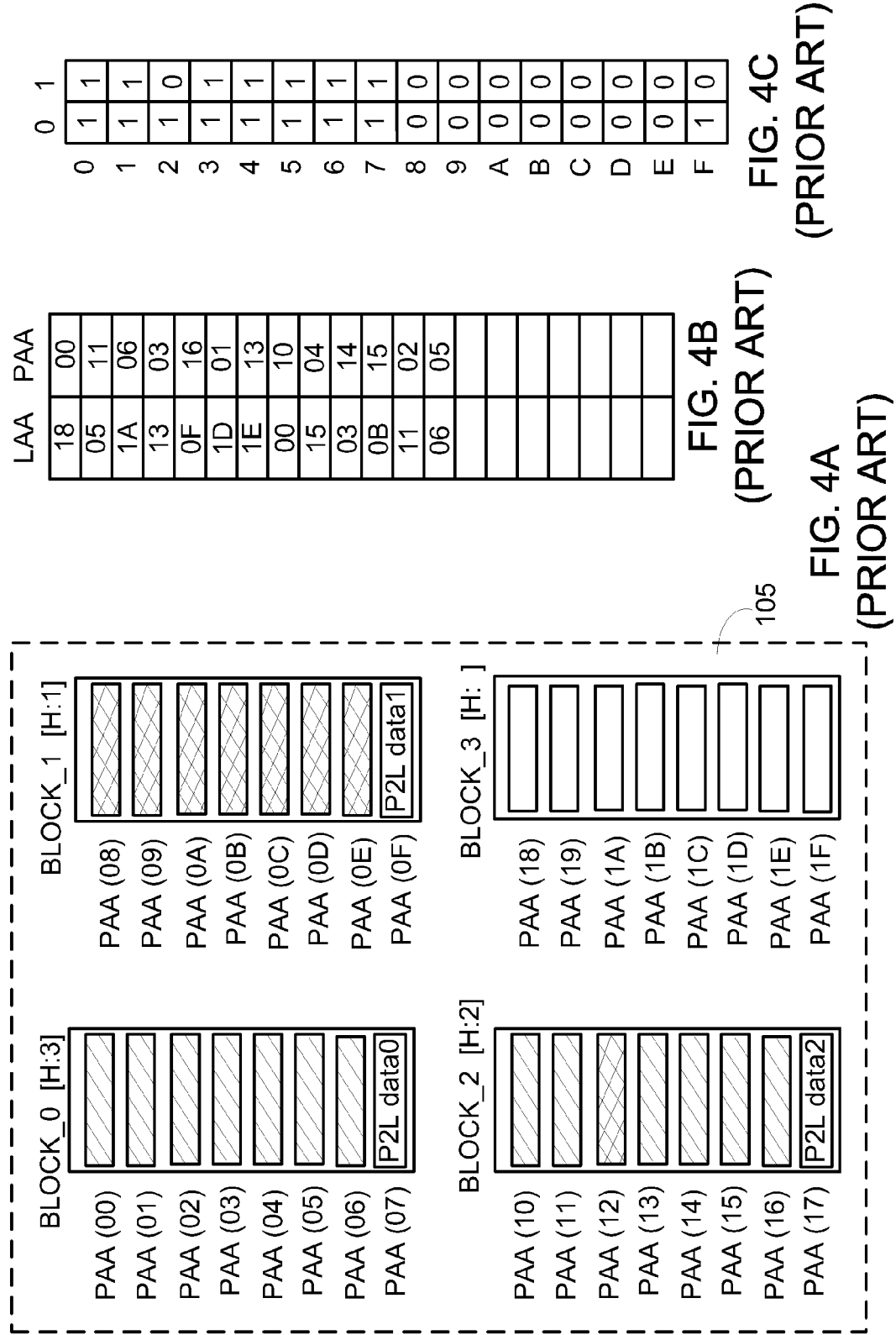

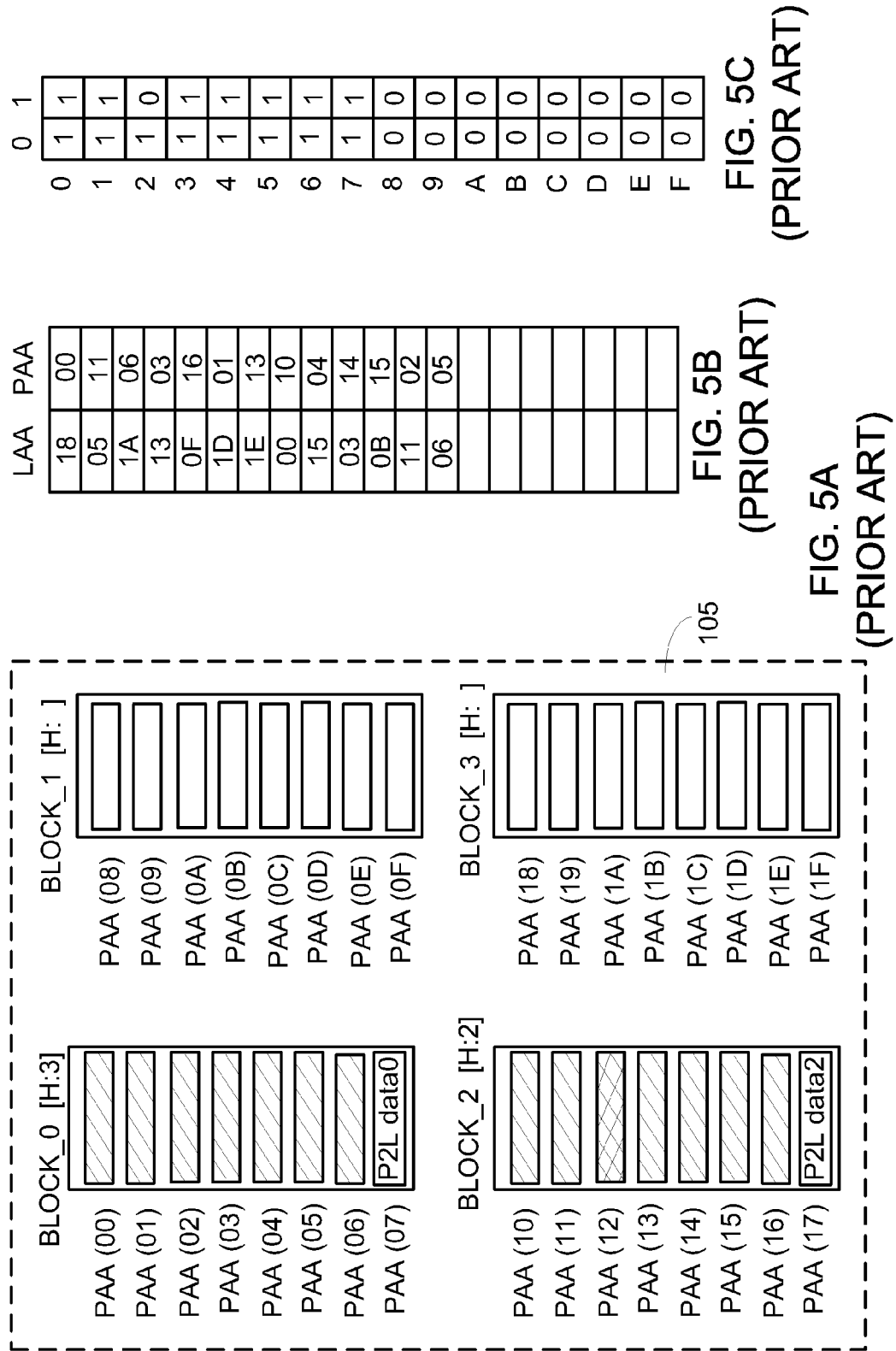

SOLID STATE DRIVE AND METHOD FOR CONSTRUCTING LOGICAL-TO-PHYSICAL TABLE THEREOF

This application claims the benefit of People's Republic of China Application Serial No. 201110357598.6, filed Nov. 11, 2011, the subject matter of which is incorporated herein by reference.

FIELD OF THE INVENTION

The present invention relates to a storage device, and more particularly to a solid state drive. The present invention also relates to a method for constructing a logical-to-physical table of the solid state drive.

BACKGROUND OF THE INVENTION

As is well known, a solid state drive (SSD) is a data storage device that uses a NAND-based flash memory to store data. The NAND-based flash memory is a non-volatile memory. After data are written to the flash memory, if no power is supplied to the flash memory, the data are still retained in the flash memory.

FIG. 1 is a schematic functional block diagram illustrating a conventional solid state drive. As shown in FIG. 1, the solid state drive 10 comprises a controlling unit 101 and a flash memory 105. The controlling unit 101 comprises a mapping unit 107 and a history number generator 109 for managing the data within the flash memory 105. In addition, a host 12 is externally connected with the controlling unit 101 through an external bus 20. Consequently, commands and data can be exchanged between the controlling unit 101 and the host 12. Generally, the external bus 20 is a USB bus, an IEEE 1394 bus, an SATA bus, or the like.

The mapping unit 107 comprises at least one logical-to-physical table (L2P table) and a bitmap table. In a case that the solid state drive 10 is powered off, the data in the L2P table and the bitmap table of the mapping unit 107 will be deleted. The mapping unit 107 is for example a static random access memory (SRAM) or a dynamic random access memory (DRAM). Alternatively, the mapping unit 107 may be externally connected with the controlling unit 101. Hereinafter, the functions and purposes of the L2P table and the bitmap table will be illustrated in more details.

Generally, the flash memory 105 comprises a plurality of blocks. Each block comprises a plurality of pages (or sectors), for example 8 pages. Each page is typically 4K bytes in size. Due to the inherent properties of the flash memory 105, at least one page is written at a time during the writing operation is performed. In addition, the data are sequentially written into the pages of each block from a small page number to a big page number.

When a write data is written into a specified block, a history number corresponding to the write data is provided to the specified block by the history number generator 109. Generally, the history numbers are provided by the history number generator 109 in an ascending order, and the history numbers are all unique. That is, if the history number provided to the block is the highest, the data written into the block is the newest. In addition, the data-erasing operation is performed in a block-wise fashion. After the block is erased, the corresponding history number is also erased. Until the write data is written into the specified block again, a new history number is provided to the specified block by the history number generator 109.

Due to the inherent properties of the flash memory 105, if the data of a specified page of a block needs to be modified, the controlling unit 101 fails to directly correct the data of the page. Whereas, the data to be modified should be written into another blank page by the controlling unit 101. Under this circumstance, the old page is considered as an invalid page, and the data contained therein is considered as an invalid data.

The data transmission between the host 12 and the solid state drive 10 will be illustrated as follows. Generally, the host 12 and the solid state drive 10 are in communication with each other through logical block addresses (LBA). Each LBA can store data of 512 bytes in size. For example, if the host 12 wants to write data, the host 12 may issue a write command and provide LBA (X) and the 512-byte data. After the write command is received by the solid state drive 10, the 512-byte data is stored into the LBA (X) location. Similarly, if the host 12 wants to read data, the host may issue a read command and provides LBA (Y). After the read command is received by the solid state drive 10, the 512-byte data at the LBA (Y) location will be transmitted to the host 12.

On the other hand, the components within the solid state drive 10 are in communication with each other through logical allocation addresses (LAA). The storage capacity of each LAA is defined by the solid state drive 10 itself, for example 4 Kbytes LAA or 8 Kbytes LAA.

Take the 4 Kbytes LAA for example. Each LAA can store eight times the size of the LBA (i.e. 4 Kbytes/512 Bytes=8). In other words, if the host issues the LBA (X), the controlling unit 101 will divide X by 8. The quotient is considered as LAA, and the reminder may be used to find out the location of storing specified 512 Bytes.

Moreover, the L2P table provides a table of correlating the LAA with the physical allocation address (PAA). The size of the PAA is equal to the size of the LAA. The bitmap table denotes all PAA locations. In addition, one bit is used to indicate whether the PAA location contains the valid data or not. Hereinafter, the functions and operations of the flash memory, the L2P table and the bitmap table of the solid state drive will be illustrated with reference to FIGS. 2, 3, 4 and 5.

For illustration, it is assumed that the flash memory 105 has four blocks (Block_0~Block_3). Each block has eight pages. The size of each page is 4 Kbytes. Moreover, in the flash memory 105, the size of each PAA is 4 Kbytes and the size of each LAA is 4 Kbytes.

FIGS. 2A, 2B and 2C schematically illustrate the flash memory, the L2P table and the bitmap table of the conventional solid state drive, respectively, in which the write data are stored in the first block of the flash memory. Please refer to FIG. 2A. After the write data generated by the host are transferred from LBA to LAA, the data are written into the locations corresponding to the logical allocation addresses LAA(18), LAA(05), LAA(1A), LAA(13), LAA(0F), LAA(1D) and LAA(1E). By the controlling unit 101, the write data are stored into the physical allocation addresses PAA(08)~PAA(0E) of the first block (Block_1). As shown in FIG. 2B, the L2P table shows the relationship between LAA and PAA. In addition, as shown in the bitmap table of FIG. 2C, the fields corresponding to the PAA(08)~PAA(0E) locations are set as "1" to indicate that the write data in the PAA(08)~PAA(0E) locations are valid data; and the other PAA fields of the bitmap table are set as "0" to indicate that the write data in other PAA locations are invalid data.

The last page of the first block (Block_1) is used to close block. After the block-closing operation is done, all physical to logical data of the first block (Block_1) (i.e. the P2L data1 of the first block) are filled into the last page. The P2L data1 is identical to the relationship of the L2P table of FIG. 2B.

Moreover, at the time when the block-closing operation is done, the history number generator 109 provides a history number 1(H:1) to indicate that the first block (Block_1) is the firstly closed block.

FIGS. 3A, 3B and 3C schematically illustrate the flash memory, the L2P table and the bitmap table of the conventional solid state drive, respectively, in which the write data are further stored in the second block of the flash memory. Please refer to FIG. 3A. After the write data generated by the host are transferred from LBA to LAA, the data are sequentially written into the locations corresponding to the logical allocation addresses LAA(00), LAA(05), LAA(15), LAA (1E), LAA(03), LAA(0B) and LAA(0F). The data in the LAA(05), LAA(0F) and LAA(1E) locations are refreshed data. By the controlling unit 101, the write data are stored into the PAA(10)~PAA(16) locations of the second block (Block_2).

Please refer to FIGS. 3A and 3B again. In the L2P table, the data corresponding to LAA(00) location is written into the PAA(10) location, and the data corresponding to LAA(05) location is written into the PAA(11) location. Since the data in the original PAA(09) location has been replaced, the data in the PAA(09) location becomes an invalid data. The data corresponding to the LAA(15) location is written into the PAA (12) location. The data corresponding to LAA(1E) location is written into the PAA(13) location. Since the data corresponding to the original PAA(0E) location has been replaced, the data in the PAA(0E) location becomes an invalid data. The data corresponding to LAA(03) is written into the PAA(14) location. The data corresponding to the LAA(0B) location is written into the PAA(15) location. The data corresponding to the LAA(0F) location is written into the PAA(16) location. Since the data in the original PAA(0C) location has been replaced, the data in the PAA(0C) location becomes an invalid data. In addition, as shown in the bitmap table of FIG. 3C, the fields corresponding to the PAA(10)~PAA(16) locations are set as "1" to indicate that the write data in the PAA(10)~PAA (16) locations are valid data; and the fields corresponding to the PAA(09), PAA(0C) and PAA(0E) locations are switched from "1" to "0" to indicate that the write data in these PAA locations are invalid data.

Moreover, at the time when the block-closing operation on the second block (Block_2) is done, the history number generator 109 provides a history number 2(H:2) to indicate that the P2L data2 is filled into the last page of the second block (Block_2).

FIGS. 4A, 4B and 4C schematically illustrate the flash memory, the L2P table and the bitmap table of the conventional solid state drive, respectively, in which the write data are further stored in the zero-th block of the flash memory. Please refer to FIG. 4A. After the write data generated by the host are transferred from LBA to LAA, the data are sequentially written into the locations corresponding to the logical allocation addresses LAA(18), LAA(1D), LAA(11), LAA (13), LAA(15), LAA(06) and LAA(1A). The data in the LAA(18), LAA(1A), LAA(13), LAA(1D) and LAA(15) locations are refreshed data. By the controlling unit 101, the write data are stored into the PAA(00)~PAA(06) locations of the zero-th block (Block_0).

Please refer to FIGS. 4A and 4B again. In the L2P table, the data corresponding to the LAA(18) location is written into the PAA(00) location. Since the data in the original PAA(08) location has been replaced, the data in the PAA(08) location becomes an invalid data. The data corresponding to the LAA (1D) location is written into the PAA(01) location. Since the data in the original PAA(0D) location has been replaced, the data in the PAA(0D) location becomes an invalid data. The data corresponding to the LAA(11) location is written into the PAA(02) location. The data corresponding to the LAA(13) location is written into the PAA(03) location. Since the data in the original PAA(0B) location has been replaced, the data in the PAA(0B) location becomes an invalid data. The data corresponding to the LAA(15) location is written into the PAA(04) location. Since the data in the original PAA(12) location has been replaced, the data in the PAA(12) location becomes an invalid data. The data corresponding to the LAA (06) location is written into the PAA(05) location. The data corresponding to the LAA(1A) location is written into the PAA(06) location. Since the data in the original PAA(0A) has been replaced, the data in the PAA(0A) becomes an invalid data. In addition, as shown in the bitmap table of FIG. 4C, the fields corresponding to the PAA(00)~PAA(07) locations are set as "1" to indicate that the write data in the PAA(00)~PAA (07) locations are valid data; and the fields corresponding to the PAA(08), PAA(0A), PAA(0B), PAA(0D) and PAA(12) locations are switched from "1" to "0" to indicate that the write data in these PAA locations are invalid data.

Moreover, at the time when the block-closing operation on the zero-th block (Block_0) is done, the history number generator 109 provides a history number 3(H:3) to indicate that the P2L data0 is filled into the last page of the zero-th block (Block_0).

Meanwhile, since the data in the first block (Block_1) are all invalid data (see FIG. 4A), a block-erasing operation may be performed on first block (Block_1). FIGS. 5A, 5B and 5C schematically illustrate the flash memory, the L2P table and the bitmap table of the conventional solid state drive, respectively, in which the first block of the flash memory is erased. As shown in FIG. 5A, the pages corresponding to the PAA (08)~PAA(0E) locations of the first block (Block_1) are all blank pages, and the history number is erased. The L2P table of FIG. 5B is identical to that of FIG. 5A. Moreover, the PAA(08)~PAA(0F) fields of the bitmap table of FIG. 5C are all set as "0".

From the above discussions, during the process of writing data or refreshing data, the L2P table and the bitmap table of the conventional solid state drive should be synchronously undated. In such way, the controlling unit 101 can confirm the relationships of all data in the flash memory and effectively manage the data.

However, if the solid state drive 10 is powered off, the data in the L2P table and the bitmap table of the mapping unit 107 will be deleted. Once the solid state drive 10 is powered on again, the L2P table and the bitmap table should be reconstructed by the controlling unit 101 in a short time. Once the solid state drive 10 is powered on again, the controlling unit 101 needs to reconstruct the L2P table and the bitmap table according to the P2L data stored in all blocks.

Nowadays, since the capacity of the solid state drive is gradually increased, the number of blocks contained in the flash memory is increased. As known, when the solid state drive 10 is powered on again, it is time-consuming to reconstruct the L2P table and the bitmap table by the above method. For example, if the capacity of the solid state drive is 100 G, it takes more than 3 minutes to reconstruct the L2P table and the bitmap table.

SUMMARY OF THE INVENTION

The present invention provides a solid state drive. The present invention also provides a method for constructing a logical-to-physical table (L2P table) of the solid state drive in order to quickly reconstruct the L2P table and the bitmap table and reduce the time period of reconstructing the L2P table and the bitmap table.

A first embodiment of the present invention provides a solid state drive. The solid state drive includes a flash memory and a controlling unit. The flash memory has a plurality of blocks storing write data. The blocks have respective history number and respective physical-to-logical data. The controlling unit is connected with the flash memory, and includes a history number generator and a mapping unit. The history number generator provides history numbers to respective blocks in an ascending order according to a writing sequence of the blocks. The mapping unit includes a logical-to-physical table and a bitmap table. Once the history number reaches a first value, the first value is set as a reference history number, and the logical-to-physical table and the bitmap table are written into the flash memory by the controlling unit. Once the solid state drive is powered on again, the logical-to-physical table and the bitmap table in the flash memory are read by the controlling unit and stored into the mapping unit, the newly-written blocks whose history numbers are higher than the reference history number are searched from the flash memory by the controlling unit, then the physical-to-logical data in the newly-written blocks are sequentially reconstructed into the logical-to-physical table and the bitmap table of the mapping unit according to the history numbers in an ascending order, and then the bitmap table is verified according to the reconstructed logical-to-physical table of the mapping unit.

A second embodiment of the present invention provides a method for constructing a logical-to-physical table of a solid state drive. The solid state drive includes a flash memory and a mapping unit. The flash memory has a plurality of blocks storing write data. The blocks having respective history number and respective physical-to-logical data. The history number generator provides history numbers to respective blocks in an ascending order according to a writing sequence of the blocks. The mapping unit includes a logical-to-physical table and a bitmap table. The method includes the following steps. Firstly, once the history number reaches a first value, the first value is set as a reference history number, and the logical-to-physical table and the bitmap table of in mapping unit are stored into the flash memory. Once the solid state drive is powered on again, the logical-to-physical table and the bitmap table are read from the flash memory, and the logical-to-physical table and the bitmap table are stored into the mapping unit. Then, the newly-written blocks whose history numbers are higher than the reference history number are searched from the flash memory. The physical-to-logical data of the newly-written blocks are sequentially reconstructed into the logical-to-physical table and the bitmap table of the mapping unit according to the history numbers in an ascending order. Afterwards, the bitmap table is verified according to the reconstructed logical-to-physical table of the mapping unit.

A third embodiment of the present invention provides a method for constructing a logical-to-physical table of a solid state drive. The solid state drive includes a flash memory. The method includes the following steps. Firstly, write data are written into a plurality of blocks of the flash memory, and respective history number and respective physical-to-logical data are recorded into the plurality of blocks, wherein the history numbers are generated in an ascending order according to a writing sequence of the blocks. The method includes the following steps. Firstly, a logical-to-physical table and a bitmap table of a mapping unit are updated during the write data is written into the flash memory. Once the history number reaches a first value, the first value is set as a reference history number, and the logical-to-physical table and the bitmap table in the mapping unit are stored into the flash memory. Once the solid state drive is powered on again, the logical-to-physical table and the bitmap table are read from the flash memory, and the logical-to-physical table and the bitmap table are stored into the mapping unit. Then, the newly-written blocks whose history numbers are higher than the reference history number are searched from the flash memory. The physical-to-logical data of the newly-written blocks are sequentially reconstructed into the logical-to-physical table and the bitmap table of the mapping unit according to the history numbers in an ascending order. Afterwards, the bitmap table is verified according to the reconstructed logical-to-physical table of the mapping unit.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIGS. 2A, 2B and 2C (prior art) schematically illustrate the flash memory, the L2P table and the bitmap table of the conventional solid state drive, respectively, in which the write data are stored in the first block of the flash memory;

FIGS. 3A, 3B and 3C (prior art) schematically illustrate the flash memory, the L2P table and the bitmap table of the conventional solid state drive, respectively, in which the write data are further stored in the second block of the flash memory;

FIGS. 4A, 4B and 4C (prior art) schematically illustrate the flash memory, the L2P table and the bitmap table of the conventional solid state drive, respectively, in which the write data are further stored in the zero-th block of the flash memory;

FIGS. 5A, 5B and 5C (prior art) schematically illustrate the flash memory, the L2P table and the bitmap table of the conventional solid state drive, respectively, in which the first block of the flash memory is erased;

DETAILED DESCRIPTION OF PREFERRED EMBODIMENTS

Figure 1:
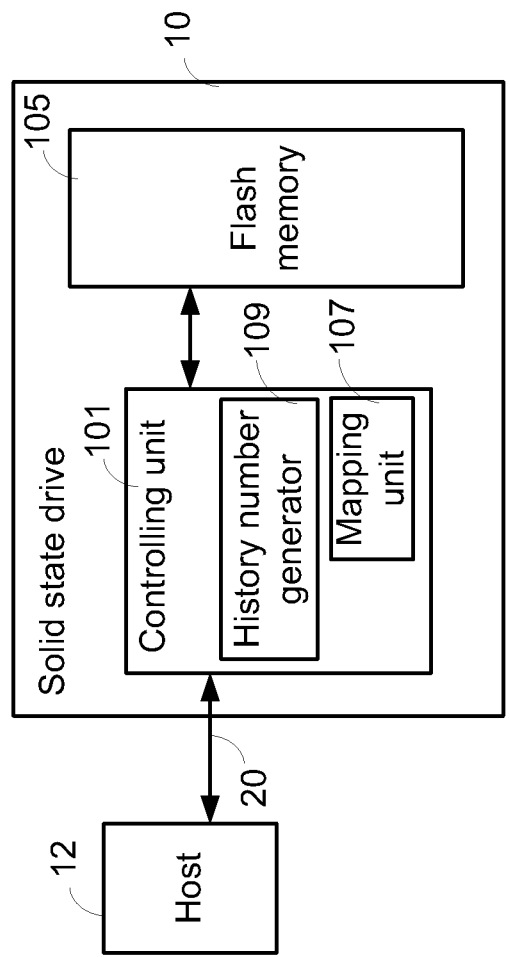
FIG. 1 (prior art) is a schematic functional block diagram illustrating a conventional solid state drive.

As previously described, once the solid state drive is powered on again, the controlling unit needs to read the P2L data from all blocks and reconstruct the L2P table and the bitmap table according to the P2L data. In addition, the conventional process of reconstructing the L2P table and the bitmap table is time-consuming. For solving the above drawbacks, the present invention provides a method for quickly reconstructing the L2P table and the bitmap table. The architecture of the solid state drive used in the present invention is similar to that of the solid state drive of FIG. 1, and is not redundantly described herein.

In accordance with the present invention, after the solid state drive is powered on and normally operated, the history numbers generated by the history number generator will be continuously detected by the controlling unit. Once the history number reaches a first value, the L2P table and the bitmap table are written into the flash memory. Then, once the history number from the history number generator is increased by every constant value, the L2P table and the bitmap table in the flash memory are updated. Even if the solid state drive is power off, the updated L2P table and the updated bitmap table in the flash memory do not vanish. After the solid state drive is powered on again, the L2P table and the bitmap table will be read from the flash memory, and then the L2P table and the bitmap table will be quickly reconstructed.

Figure 6:
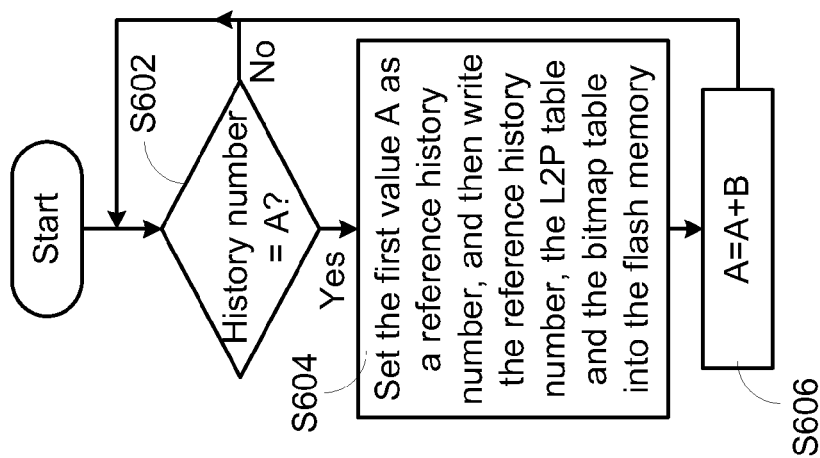
FIG. 6 is a flowchart illustrating a process of updating the L2P table and the bitmap table of the flash memory according to an embodiment of the present invention.

FIG. 6 is a flowchart illustrating a process of updating the L2P table and the bitmap table of the flash memory according to an embodiment of the present invention. During normal operation of the solid state drive, the history number is continuously detected. Then, the step S602 is performed to judge whether the history number reaches a first value A. Once the history number reaches the first value A, the first value A is set as a reference history number, and then the reference history number, the L2P table and the bitmap table are written into the flash memory (Step S604). Then, the first value is updated as (A+B), and the step S602 is repeatedly done, wherein B is a constant value.

For example, A and B are both 100. Once the history number of the solid state drive reaches 100, the controlling unit will set the current history number as the reference history number, and then write the reference history number, the L2P table and the bitmap table into the flash memory. Similarly, once the history number is increased by 100, the updated reference history number, the L2P table and the bitmap table are written into the flash memory again by the controlling unit.

Consequently, in a case that the solid state drive is powered off and then the solid state drive is powered on again, the controlling unit may read the newly-stored L2P table, the bitmap table and the reference history number from the solid state drive, and then store the L2P table, the bitmap table into the mapping unit. Then, the blocks whose history numbers are higher than the reference history number are searched from the flash memory. According to the history numbers in an ascending order, the P2L data in the blocks are sequentially reconstructed into the L2P table and the bitmap table of the mapping unit.

For example, once the reference history number is 200, the L2P table and the bitmap table corresponding to this reference history number will be written into the flash memory by the controlling unit. Once the history number is 230, the solid state drive is powered off. In a case that the solid state drive is powered on again, the controlling unit will firstly store the L2P table and the bitmap table of the flash memory into the mapping unit. Then, the blocks whose history numbers are in the range between 201 and 230 will be searched from the flash memory. According to the history numbers in the ascending order, the P2L data in the blocks whose history numbers are in the range between 201 and 230 are sequentially reconstructed into the L2P table and the bitmap table of the mapping unit. From the above discussions, after the solid state drive is powered on again, it is only necessary to read the P2L data from at most 30 blocks in order to update the L2P table. In such way, the L2P table can be reconstructed. By the method of the present invention, the controlling unit no longer needs much time to read the P2L data of all blocks to reconstruct the L2P table.

Moreover, after the L2P table is reconstructed, it is necessary to verify whether the bitmap table is correct or not according to the PAA location of the L2P table. The result of the verification process may be used to confirm whether the bitmap table is reconstructed.

Moreover, during the process of verifying the bitmap table according to the PAA location of the L2P table, only the PAA locations of the blocks of the L2P table whose history numbers are higher than the reference history number need to be verified. Since it is not necessary to verify the PAA locations of all blocks of the L2P table, the time period required to perform the verifying process is reduced and the startup efficiency is enhanced.

Figure 7:
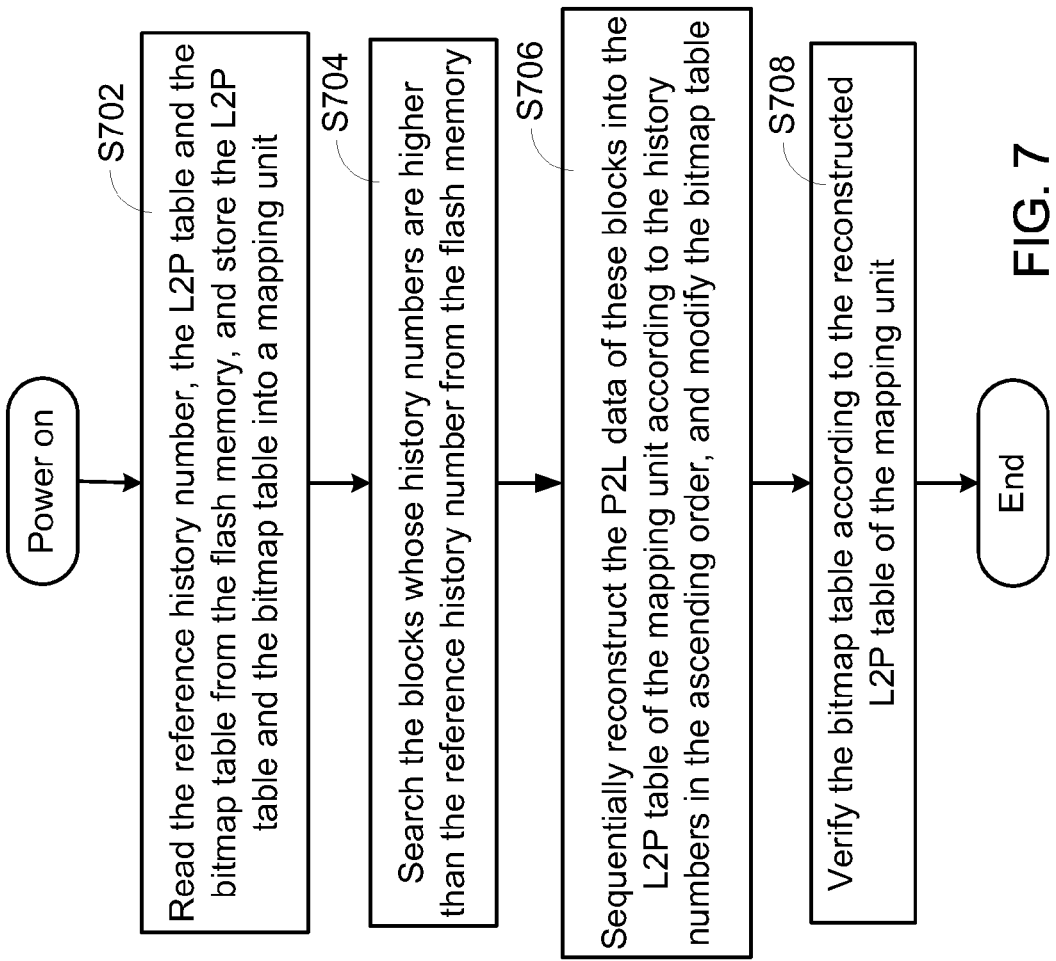
FIG. 7 is a flowchart illustrating a method of constructing a L2P table of a solid state drive according to an embodiment of the present invention.

FIG. 7 is a flowchart illustrating a method of constructing a L2P table of a solid state drive according to an embodiment of the present invention. After the solid state drive is powered on again, the controlling unit reads the reference history number, the L2P table and the bitmap table from the flash memory, and stores the L2P table and the bitmap table into a mapping unit (Step S702). Then, the blocks whose history numbers are higher than the reference history number are searched from the flash memory by the controlling unit (Step S704). Then, according to the history numbers in the ascending order, the P2L data in these blocks are sequentially reconstructed into the L2P table of the mapping unit and the bitmap table is also modified (Step S706). Afterwards, the bitmap table is verified according to the reconstructed L2P table of the mapping unit (Step S708).

Figure 8:
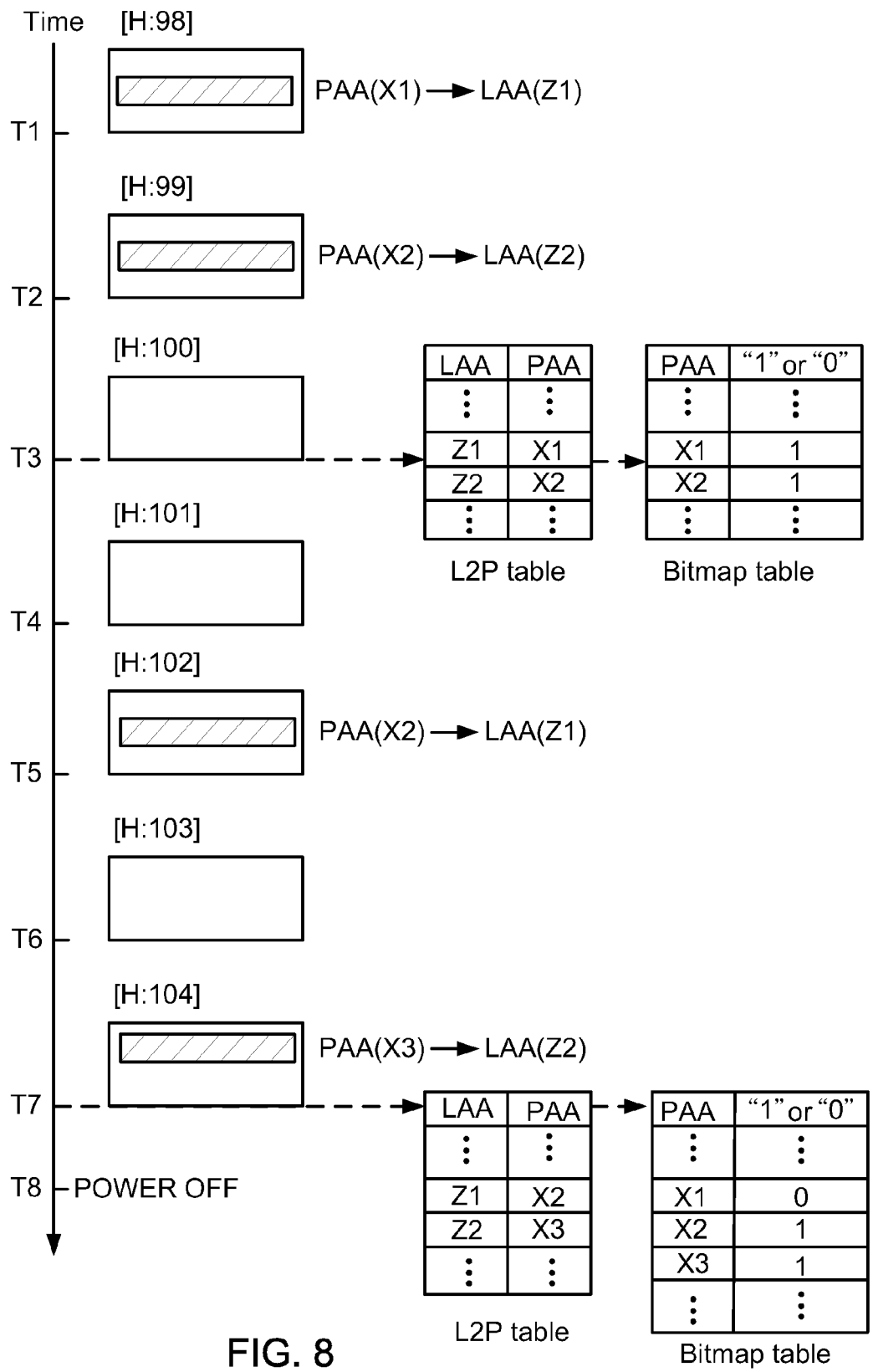
FIG. 8 schematically illustrates the variations of the L2P table and the bitmap table in the mapping unit of the solid state drive at different time spots according to an embodiment of the present invention.

FIG. 8 schematically illustrates the variations of the L2P table and the bitmap table in the mapping unit of the solid state drive at different time spots according to an embodiment of the present invention. For clarification, only the relationships between LAA(Z1), LAA(Z2), PAA(X1), PAA(X2) and PAA(X3) are illustrated as follows.

Please refer to FIG. 8. As time increases, the history number is gradually increased. At the time spot T1 when the first block with the history number [H:98] is closed, the P2L data in the first block records that PAA(X1) corresponds to LAA (Z1). At the time spot T2 when the second block with the history number [H:99] is closed, the P2L data in the second block records that PAA(X2) corresponds to LAA(Z2). At the time spot T3, the third block with the history number [H:100] is closed. Since the history number reaches 100 at the time spot T3, the reference history number is set as 100, and the L2P table and the bitmap table are stored into the flash memory. At the time spot T3, in the L2P table, LAA(Z1) corresponds to PAA(X1) and LAA(Z2) corresponds to PAA (X2). As shown in the bitmap table, the data corresponding to the PAA(X1) location is a valid data (1) and the data corresponding to the PAA(X2) location is a valid data (1).

At the time spot T4, the fourth block with the history number [H:101] is closed. At the time spot T5 when the fifth block with the history number [H:102] is closed, the P2L data in the second block records that PAA(X2) corresponds to LAA(Z1). At the time spot T6, the fourth block with the history number [H:103] is closed. At the time spot T7 when the seventh block with the history number [H:104] is closed, the P2L data in the second block records that PAA(X3) corresponds to LAA(Z2). At the time spot T8, the solid state drive is powered off.

Please refer to FIG. 8 again. At the time spot T7 before the solid state drive is powered off, in the L2P table, LAA(Z1) corresponds to PAA(X2) and LAA(Z2) corresponds to PAA(X3). As shown in the bitmap table, the data corresponding to the PAA(X1) location is an invalid data (0), the data corresponding to the PAA(X2) location is a valid data (1), and the data corresponding to the PAA(X3) location is a valid data (1). Moreover, at the time spot T8, the data in the L2P table and the bitmap table are all deleted.

Figure 9A:
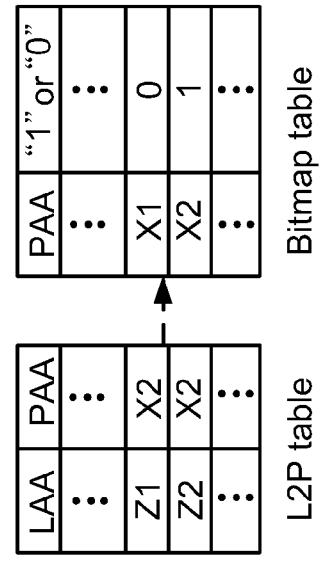
FIGS. 9A-9D schematically illustrate a process of reconstructing the L2P table and the bitmap table according to the present invention.
Figure 9B:
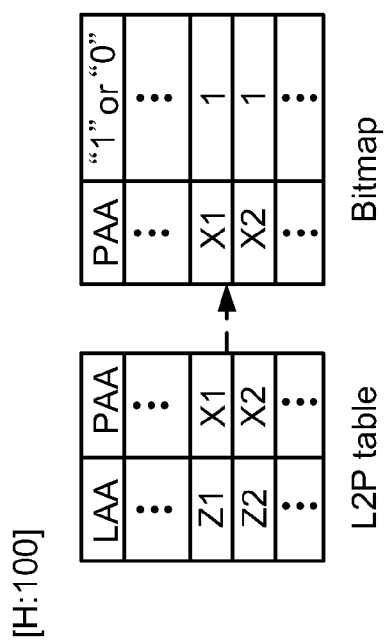

FIGS. 9A~9D schematically illustrate a process of reconstructing the L2P table and the bitmap table according to the present invention. After the time spot T8, the solid state drive is powered on again. Consequently, as shown in FIG. 9A, the L2P table and the bitmap table of the flash memory corresponding to the history number [H:100] are stored into the mapping unit.

After the history numbers of all blocks have been searched, the controlling unit realizes that the highest history number is [H:104]. Consequently, the P2L data of four blocks should be read to sequentially modify the L2P table and the bitmap table of the mapping unit. These four blocks include the fourth block with the history number [H:101], the fifth block with the history number [H:102], the sixth block with the history number [H:103], and the seventh block with the history number [H:104].

As shown in FIG. 8, the P2L data of the fifth block with the history number [H:102] records that PAA(X2) corresponds to LAA(Z1). Consequently, as shown in the L2P table of FIG. 9B, LAA(Z1) should correspond to PAA(X2). Since the original PAA(X1) location corresponds no LAA location, the data corresponding to the PAA(X1) location is an invalid data, and the PAA(X1) field of the bitmap table is set as "0". Moreover, since the data corresponding to the PAA(X2) location is a valid data, the PAA(X2) field of the bitmap table is set as "1". Since the PAA(X2) field of the bitmap table is "1", it is not necessary to update this field.

As shown in FIG. 8, the P2L data of the seventh block with the history number [H:104] records that PAA(X3) corresponds to LAA(Z2). Consequently, as shown in the L2P table of FIG. 9C, LAA(Z2) should correspond to PAA(X3). Since the original PAA(X2) location corresponds no LAA location, the data corresponding to the PAA(X2) location is an invalid data, and the PAA(X2) field of the bitmap table is set as "0". Moreover, since the data corresponding to the PAA(X3) location is a valid data, the PAA(X3) field of the bitmap table is set as "1".

Figure 9C:
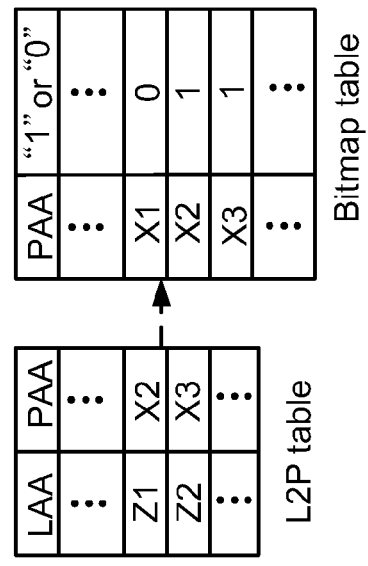

From the above discussions, according to the history numbers in the ascending order, the P2L data in the blocks are sequentially reconstructed into the L2P table and the bitmap table of the mapping unit. It is confirmed that the L2P table in the mapping unit and shown in FIG. 9C is correct. However, the bitmap table as shown in FIG. 9C needs to further verified according to the L2P table. As shown in FIG. 9C, although LAA(Z1) corresponds to PAA(X2), the PAA(X2) filed in the bitmap table is set as an invalid data (0).

Since the data recorded in the PAA location of the L2P table is a valid data, the verification process is performed to confirm whether the PAA field of the bitmap table corresponding to the PAA location of the L2P table is set as the valid data.

Figure 9D:
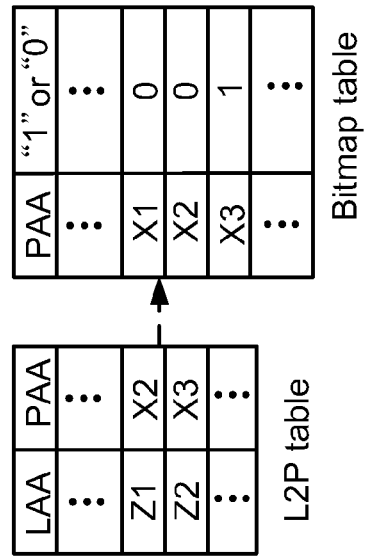

Please refer to FIG. 9D. The verification process is performed to confirm whether the PAA(X2) and PAA(X3) fields of the bitmap table are set as valid data (1) according to the PAA(X2) and PAA(X3) locations recorded in the L2P table.

After the verification process is performed, it is found that the PAA(X2) field is set as an invalid data (0). Consequently, the PAA(X2) field of the bitmap table is set as a valid data (1) again.

Moreover, during the process of reconstructing the L2P table and the bitmap table, only the PAA locations of the blocks whose history numbers are higher than the reference history number are updated. Consequently, during the verification process is performed, only the PAA locations of the blocks whose history numbers are higher than the reference history number need to be verified. For example, in the above example, the PAA locations of the blocks of the L2P table whose history numbers are higher than the reference history number include the PAA(X2) location of the block with the history number [H:102] and the PAA(X3) of the block with the history number [H:104]. Instead of verifying all PAA locations of the L2P table, only the PAA(X2) field and the PAA(X3) field of the bitmap table need to be verified.

After the verification process is performed, the data in the bitmap table are confirmed to be correct. Consequently, after the L2P table and the bitmap table in the mapping unit are constructed, the flash memory can be in normal communication with the host, and the controlling unit can manage the data of the flash memory according to the mapping unit.

From the above description, the present invention provides a method for constructing a L2P table of the solid state drive, so that the L2P table and the bitmap table can be quickly reconstructed. As previously described, in the conventional method of reconstructing the L2P table, a long time period is required for the controlling unit to read the P2L data of all blocks. In comparison with the conventional method, the time period of reconstructing the L2P table according to the method of the present invention is largely reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A solid state drive, comprising:
    a flash memory having a plurality of blocks storing write data, wherein the blocks have respective history number and respective physical-to-logical data; and
    a controlling unit connected with the flash memory, and comprising a history number generator and a mapping unit, wherein the history number generator provides history numbers to respective blocks in an ascending order according to a writing sequence of the blocks, and the mapping unit comprises a logical-to-physical table and a bitmap table, wherein the bitmap table is used to indicate whether plurality of physical allocation addresses located in the flash memory respectively contain valid data or not, wherein once the history number reaches a first value, the first value is set as a reference history number, and the logical-to-physical table and the bitmap table are written into the flash memory by the controlling unit,
    wherein once the solid state drive is powered on again, the logical-to-physical table and the bitmap table in the flash memory are read by the controlling unit and stored into the mapping unit, the newly-written blocks whose history numbers are higher than the reference history number are searched from the flash memory by the controlling unit, then the physical-to-logical data in the newly-written blocks are sequentially reconstructed into the logical-to-physical table and the bitmap table of the mapping unit according to the history numbers in an ascending order, and then the bitmap table is verified by confirming whether the physical allocation addresses contained in the reconstructed logical-to-physical table are set as valid data.

2. The solid state drive as claimed in claim 1, wherein the controlling unit further searches a plurality of physical allocation addresses from the logical-to-physical table, wherein the history numbers corresponding to the plurality of physical allocation addresses are higher than the reference history number, and the controlling unit further verifies field contents of the bitmap table corresponding to the plurality of physical allocation addresses.

3. The solid state drive as claimed in claim 1, wherein once the history number reaches the first value, the controlling unit adds a constant value to the first value and set the sum of the constant value and the first value as an updated first value, wherein once the history number reaches the updated first value again, the updated first value is set as the reference history number, and the logical-to-physical table and the bitmap table in the mapping unit are written into the flash memory by the controlling unit.

4. A method for constructing a logical-to-physical table of a solid state drive, the solid state drive comprising a flash memory and a mapping unit, the flash memory having a plurality of blocks storing write data, the blocks having respective history number and respective physical-to-logical data, the history number generator providing history numbers to respective blocks in an ascending order according to a writing sequence of the blocks, the mapping unit comprising a logical-to-physical table and a bitmap table, wherein the bitmap table is used to indicate whether plurality of physical allocation addresses located in the flash memory respectively contain valid data or not, the method comprising steps of:

once the history number reaches a first value, setting the first value as a reference history number, and allowing the logical-to-physical table and the bitmap table of in mapping unit to be stored into the flash memory;

once the solid state drive is powered on again, reading the logical-to-physical table and the bitmap table from the flash memory, and storing the logical-to-physical table and the bitmap table into the mapping unit;

searching the newly-written blocks whose history numbers are higher than the reference history number from the flash memory;

sequentially reconstructing the physical-to-logical data of the newly-written blocks into the logical-to-physical table and the bitmap table of the mapping unit according to the history numbers in an ascending order; and verifying the bitmap table by confirming whether the physical allocation addresses contained in the reconstructed logical-to-physical table are set as valid data.

5. The method as claimed in claim 4, further comprising steps of:

searching a plurality of physical allocation addresses from the logical-to-physical table, wherein the history numbers corresponding to the plurality of physical allocation addresses are higher than the reference history number; and verifying field contents of the bitmap table corresponding to the plurality of physical allocation addresses.

6. The method as claimed in claim 4, further comprising steps of:

once the history number reaches the first value, setting the sum of a constant value and the first value as an updated first value; and once the history number reaches the updated first value again, setting the updated first value as the reference history number, and allowing the logical-to-physical table and the bitmap table in the mapping unit to be written into the flash memory.

7. A method for constructing a logical-to-physical table of a solid state drive, the solid state drive comprising a flash memory, the method comprising steps of:

allowing write data to be written into a plurality of blocks of the flash memory, and recording respective history number and respective physical-to-logical data into the plurality of blocks, wherein the history numbers are generated in an ascending order according to a writing sequence of the blocks;

updating a logical-to-physical table and a bitmap table of a mapping unit during the write data is written into the flash memory, wherein the bitmap table is used to indicate whether plurality of physical allocation addresses located in the flash memory respectively contain valid data or not;

once the history number reaches a first value, setting the first value as a reference history number, and allowing the logical-to-physical table and the bitmap table in the mapping unit to be stored into the flash memory;

once the solid state drive is powered on again, reading the logical-to-physical table and the bitmap table from the flash memory, and storing the logical-to-physical table and the bitmap table into the mapping unit;

searching the newly-written blocks whose history numbers are higher than the reference history number from the flash memory;

sequentially reconstructing the physical-to-logical data of the newly-written blocks into the logical-to-physical table and the bitmap table of the mapping unit according to the history numbers in an ascending order; and verifying the bitmap table by confirming whether the physical allocation addresses contained in the reconstructed logical-to-physical table are set as valid data.

8. The method as claimed in claim 7, further comprising steps of:

searching a plurality of physical allocation addresses from the logical-to-physical table, wherein the history numbers corresponding to the plurality of physical allocation addresses are higher than the reference history number; and verifying field contents of the bitmap table corresponding to the plurality of physical allocation addresses.

9. The method as claimed in claim 7, further comprising steps of:

once the history number reaches the first value, setting the sum of a constant value and the first value as an updated first value; and once the history number reaches the updated first value again, setting the updated first value as the reference history number, and allowing the logical-to-physical table and the bitmap table in the mapping unit to be written into the flash memory.

* * * * *